(12) United States Patent
Schellenberger et al.

(10) Patent No.: US 11,055,751 B2
(45) Date of Patent: Jul. 6, 2021

(54) RESOURCE USAGE CONTROL SYSTEM

(71) Applicant: Microsoft Technology Licensing, LLC, Redmond, WA (US)

(72) Inventors: Jan Schellenberger, Belmont, CA (US); Yang Zhao, Sunnyvale, CA (US); Yin Zhang, Sunnyvale, CA (US); David Pardoe, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 190 days.

(21) Appl. No.: 15/610,529

(22) Filed: May 31, 2017

(65) Prior Publication Data

US 2018/0349964 A1 Dec. 6, 2018

(51) Int. Cl.
*G06Q 30/02* (2012.01)
*H04L 12/911* (2013.01)
*H04L 12/825* (2013.01)

(52) U.S. Cl.
CPC ..... *G06Q 30/0277* (2013.01); *G06Q 30/0249* (2013.01); *G06Q 30/0264* (2013.01); *G06Q 30/0275* (2013.01); *H04L 47/822* (2013.01); *H04L 47/263* (2013.01)

(58) Field of Classification Search
CPC .................................. G06Q 30/0207–30/0277
USPC ......... 705/14.43, 14.45, 14.48, 14.61, 14.71, 705/14.73, 14.52, 14.69
See application file for complete search history.

(56) References Cited

U.S. PATENT DOCUMENTS

| | | | |
|---|---|---|---|
| 5,848,397 A | * | 12/1998 | Marsh ................. G06Q 10/107 705/14.61 |
| 7,136,871 B2 | | 11/2006 | Ozer et al. |
| 7,260,783 B1 | | 8/2007 | Mika |
| 7,734,503 B2 | | 6/2010 | Agarwal et al. |
| 8,117,050 B2 | | 2/2012 | Li et al. |
| 8,145,762 B2 | | 3/2012 | Barber |
| 8,260,663 B1 | | 9/2012 | Ranka et al. |
| 8,402,482 B2 | | 3/2013 | Woodward et al. |
| 8,863,298 B2 | | 10/2014 | Akella et al. |
| 9,031,861 B1 | | 5/2015 | Liu et al. |
| 9,043,223 B1 | | 5/2015 | Niu et al. |
| 9,195,997 B2 | | 11/2015 | Jevtic et al. |
| 9,734,460 B1 | * | 8/2017 | Venkataraman ... G06Q 30/0641 |
| 9,767,489 B1 | | 9/2017 | Liu et al. |

(Continued)

OTHER PUBLICATIONS

"Non Final Office Action Issued in U.S. Appl. No. 15/927,979", dated Aug. 7, 2019, 14 Pages.

*Primary Examiner* — Kiersten V Summers
(74) *Attorney, Agent, or Firm* — Hickman Becker Bingham Ledesma LLP

(57) ABSTRACT

Techniques for controlling resource usage in a computing environment are provided. In one technique, a target resource usage for a particular point in time is determined for a content delivery campaign. Determining, for the content delivery campaign, a current resource usage for the particular point in time. Also, a bandwidth associated with the target resource usage at the particular point in time is determined. Based on a difference between the current resource usage and one or more boundaries of the bandwidth, a throttling factor is calculated. Based on the throttling factor, a probability of the content delivery campaign participating in a content item selection event is determined.

20 Claims, 5 Drawing Sheets

(56) References Cited

U.S. PATENT DOCUMENTS

| | | | |
|---|---|---|---|
| 10,068,247 B2* | 9/2018 | Xu | G06Q 30/0244 |
| 10,135,745 B2* | 11/2018 | Talja | H04L 51/30 |
| 2003/0051026 A1* | 3/2003 | Carter | H04L 41/00 |
| | | | 709/224 |
| 2004/0131059 A1* | 7/2004 | Ayyakad | H04L 45/60 |
| | | | 370/389 |
| 2004/0261022 A1* | 12/2004 | Deutesfeld | G06F 9/5055 |
| | | | 715/229 |
| 2005/0091087 A1* | 4/2005 | Smith | G06Q 30/0645 |
| | | | 705/5 |
| 2010/0332322 A1* | 12/2010 | Porte | G06Q 10/0631 |
| | | | 705/14.49 |
| 2012/0130804 A1* | 5/2012 | Guo | G06Q 30/0247 |
| | | | 705/14.46 |
| 2012/0155380 A1 | 6/2012 | Hodges | |
| 2012/0253926 A1* | 10/2012 | Chen | G06Q 10/06 |
| | | | 705/14.49 |
| 2013/0132301 A1* | 5/2013 | Abreu | G06Q 40/06 |
| | | | 705/36 R |
| 2014/0006141 A1* | 1/2014 | Vassilvitskii | G06Q 30/0241 |
| | | | 705/14.45 |
| 2014/0337125 A1* | 11/2014 | Dalto | G06Q 30/0254 |
| | | | 705/14.48 |
| 2015/0112795 A1* | 4/2015 | Jalali | G06Q 30/0275 |
| | | | 705/14.48 |
| 2015/0134462 A1* | 5/2015 | Jalali | G06Q 30/0275 |
| | | | 705/14.71 |
| 2015/0170222 A1* | 6/2015 | Els | G06Q 30/0275 |
| | | | 705/14.71 |
| 2015/0242907 A1* | 8/2015 | Wray | G06Q 30/0275 |
| | | | 705/14.48 |
| 2015/0339728 A1* | 11/2015 | Sura | G06Q 30/0272 |
| | | | 705/14.73 |
| 2016/0125452 A1* | 5/2016 | Kemp | G06Q 30/0267 |
| | | | 705/14.44 |
| 2016/0275571 A1* | 9/2016 | Deng | G06Q 30/0275 |
| 2016/0292714 A1* | 10/2016 | Bhalgat | G06Q 30/0242 |
| 2017/0147983 A1 | 5/2017 | Long et al. | |
| 2017/0178253 A1 | 6/2017 | Koufogiannakis et al. | |
| 2017/0223137 A1 | 8/2017 | Yu et al. | |
| 2017/0330243 A1* | 11/2017 | Fuqua | G06Q 30/0275 |
| 2018/0032583 A1 | 2/2018 | Koufogiannakis et al. | |
| 2018/0034745 A1 | 2/2018 | Zhong et al. | |
| 2019/0297028 A1 | 9/2019 | Zhao et al. | |

* cited by examiner

RESOURCE USAGE CONTROL SYSTEM

TECHNICAL FIELD

The present disclosure relates to controlling resource usage in a computing environment. SUGGESTED CLASS/SUBCLASS: 709/235. SUGGESTED ART UNIT: 2447

BACKGROUND

The Internet has enabled the delivery of electronic content to billions of people. Some entities maintain content delivery exchanges that allow different content providers to reach a wide online audience. There is a limit to the resources that are dedicated to each content delivery campaign that a content provider establishes with a content delivery exchange. It is imperative that a content delivery exchange not exceed the resource limit of any content delivery campaign. However, this imperative is difficult to implement due to constant changes in the rate of user interaction with the content and the delay between when those interactions occur and when data reporting those interactions are received and processed by the content delivery exchange. For example, a content delivery exchange may experience a large amount of online traffic that triggers presentation of content items during different parts of the day while, during other parts of the day, the content delivery exchange may experience a relatively low amount of such online activity. As another example, while many different remote users may be presented with a content item (of a content delivery campaign) through their respective computing devices, a subset of those remote users might select the content item minutes or hours later. The delay between presentation and selection makes it difficult to adequate control resource usage of the content delivery campaign.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for controlling the delivery of electronic content items over one or more computer networks are provided. In one approach, a throttling factor is calculated for a content item and dictates a probability that the content item will participate in a content item selection event. The throttling factor is determined based on a bandwidth parameter that indicates a range of target resource usage that is acceptable and within which current (actual) resource usage should be kept. The throttling factor changes over time, depending on the current resource usage. Also, different content items may be associated with different bandwidths.

System Overview

Figure 1:
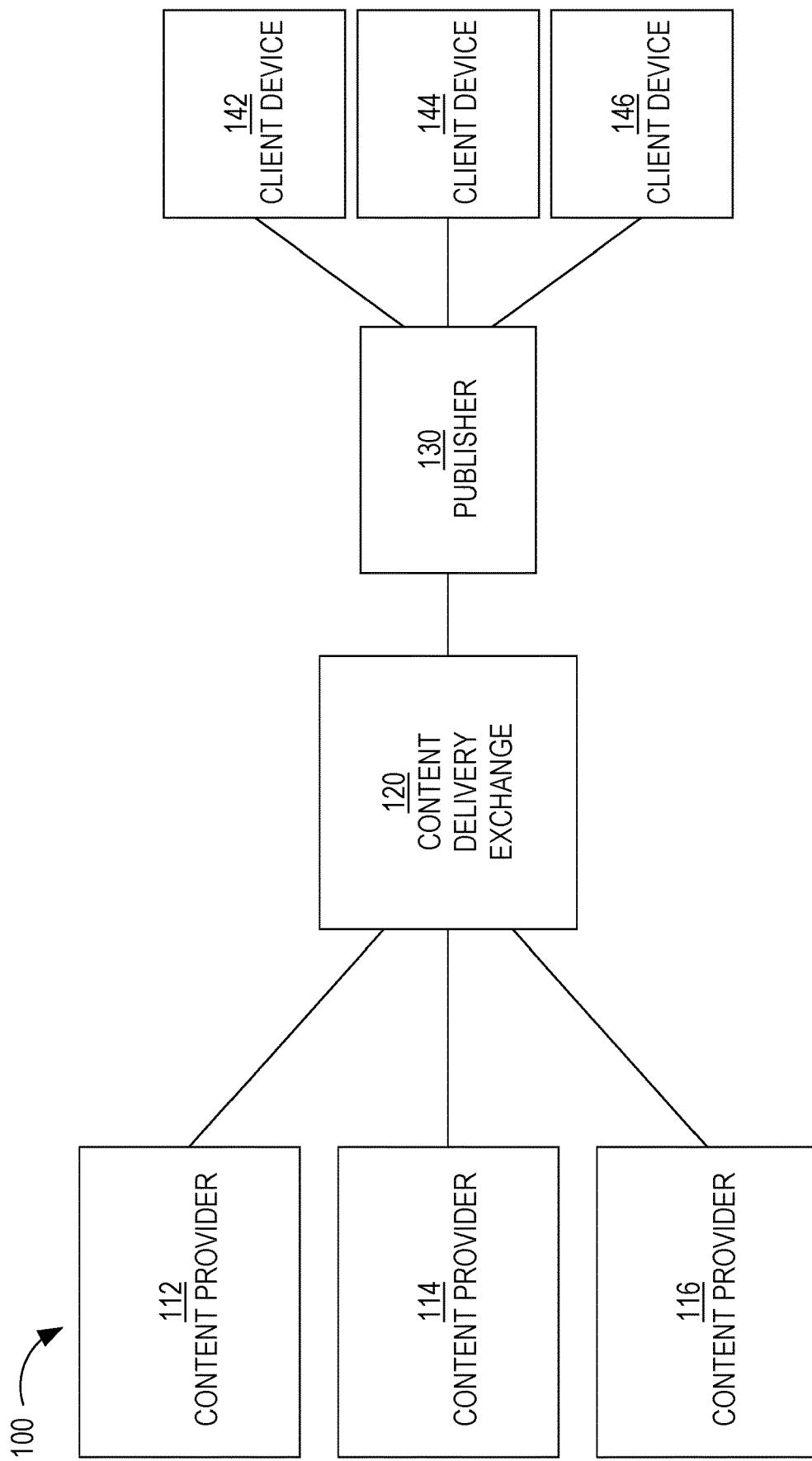
FIG. 1 is a block diagram that depicts a system for distributing content items to one or more end-users, in an embodiment.

FIG. 1 is a block diagram that depicts a system 100 for distributing content items to one or more end-users, in an embodiment. System 100 includes content providers 112-116, a content delivery exchange 120, a publisher 130, and client devices 142-146. Although three content providers are depicted, system 100 may include more or less content providers. Similarly, system 100 may include more than one publisher and more or less client devices.

Content providers 112-116 interact with content delivery exchange 120 (e.g., over a network, such as a LAN, WAN, or the Internet) to enable content items to be presented, though publisher 130, to end-users operating client devices 142-146. Thus, content providers 112-116 provide content items to content delivery exchange 120, which in turn selects content items to provide to publisher 130 for presentation to users of client devices 142-146. However, at the time that content provider 112 registers with content delivery exchange 120, neither party may know which end-users or client devices will receive content items from content provider 112, unless a target audience specified by content provider 112 is small enough.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery exchange 120.

Although depicted in a single element, content delivery exchange may comprise multiple computing elements and devices, connected in a local network or distributed regionally or globally across many networks, such as the Internet. Thus, content delivery exchange 120 may comprise multiple computing elements, including file servers and database systems.

Publisher 130 provides its own content to client devices 142-146 in response to requests initiated by users of client devices 142-146. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher 130 (and/or its affiliates). A content request may be a request that is immediately preceded by user input (e.g., selecting a hyperlink on web page) or may initiated as part of a subscription, such as through a Rich Site Summary (RSS) feed. In response to a request for content from a client device, publisher 130 provides the requested content (e.g., a web page) to the client device.

Simultaneously or immediately before or after the requested content is sent to a client device, a content request is sent to content delivery exchange 120. That request is sent (over a network, such as a LAN, WAN, or the Internet) by publisher 130 or by the client device that requested the original content from publisher 130. For example, a web page that the client device renders includes one or more calls (or HTTP requests) to content delivery exchange 120 for one or more content items. In response, content delivery exchange 120 provides (over a network, such as a LAN, WAN, or the Internet) one or more particular content items to the client device directly or through publisher 130. In this way, the one or more particular content items may be presented (e.g., displayed) concurrently with the content requested by the client device from publisher 130.

In response to receiving a content request, content delivery exchange 120 initiates a content item selection event that involves selecting one or more content items (from among multiple content items) to present to the client device that initiated the content request. An example of a content item selection event is an auction.

Content delivery exchange 120 and publisher 130 may be owned and operated by the same entity or party. Alternatively, content delivery exchange 120 and publisher 130 are owned and operated by different entities or parties.

A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 142-146 include desktop computers, laptop computers, tablet computers, wearable devices, video game consoles, and smartphones.

Bidders

In a related embodiment, system 100 also includes one or more bidders (not depicted). A bidder is a party that is different than a content provider, that interacts with content delivery exchange 120, and that bids for space (on one or more publishers, such as publisher 130) to present content items on behalf of multiple content providers. Thus, a bidder is another source of content items that content delivery exchange 120 may select for presentation through publisher 130. Thus, a bidder acts as a content provider to content delivery exchange 120 or publisher 130. Examples of bidders include AppNexus, DoubleClick, and LinkedIn. Because bidders act on behalf of content providers (e.g., advertisers), bidders create content delivery campaigns and, thus, specify user targeting criteria and, optionally, frequency cap rules, similar to a traditional content provider.

In a related embodiment, system 100 includes one or more bidders but no content providers. However, embodiments described herein are applicable to any of the above-described system arrangements.

Content Delivery Campaigns

Each content provider establishes a content delivery campaign with content delivery exchange 120. A content delivery campaign includes (or is associated with) one or more content items. Thus, the same content item may be presented to users of client devices 142-146. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view the set of content items, select or click on the set of content items, or when a certain number of users purchase a product/service associated with the content delivery campaign or fill out a particular form on a website.

A content delivery campaign may specify one or more targeting criteria that are used to determine whether to present a content item of the content delivery campaign to one or more users. Example factors include date of presentation, time of day of presentation, characteristics of a user to which the content item will be presented, attributes of a computing device that will present the content item, identity of the publisher, etc. Examples of characteristics of a user include demographic information, residence information, job title, employment status, academic degrees earned, academic institutions attended, former employers, current employer, number of connections in a social network, number and type of skills, number of endorsements, and stated interests. Examples of attributes of a computing device include type of device (e.g., smartphone, tablet, desktop, laptop), current geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 120 receives, from a computing device, a request that does not satisfy the targeting criteria, then content delivery exchange 120 ensures that any content items associated with the particular content delivery campaign are not sent to the computing device.

Thus, content delivery exchange 120 is responsible for selecting a content delivery campaign in response to a request from a remote computing device by comparing (1) targeting data associated with the computing device and/or a user of the computing device with (2) targeting criteria of one or more content delivery campaigns. Multiple content delivery campaigns may be identified in response to the request as being relevant to the user of the computing device. Content delivery campaign 120 may select a strict subset of the identified content delivery campaigns from which content items will be identified and presented to the user of the computing device.

Instead of one set of targeting criteria, a single content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher 130 may not satisfy targeting criteria of one content item of a campaign, the same content request may satisfy targeting criteria of another content item of the campaign.

Different content delivery campaigns that content delivery exchange 120 manages may have different charge models. For example, content delivery exchange 120 may charge a content provider of one content delivery campaign for each presentation of a content item from the content delivery campaign (referred to herein as cost per impression or CPM). Content delivery exchange 120 may charge a content provider of another content delivery campaign for each time a user interacts with a content item from the content delivery campaign, such as selecting or clicking on the content item (referred to herein as cost per click or CPC). Content delivery exchange 120 may charge a content provider of another content delivery campaign for each time a user performs a particular action, such as purchasing a product or service, downloading a software application, or filling out a form (referred to herein as cost per action or CPA). Content delivery exchange 120 may manage only campaigns that are of the same type of charging model or may manage campaigns that are of any combination of the three types of charging models.

A content delivery campaign may be associated with a budget (or "resource allocation") that indicates how much the corresponding content provider is willing to be charged by content delivery exchange 120, such as $100 or $5,200. A content delivery campaign may also be associated with a bid value (or "individual resource reduction amount") that indicates how much the corresponding content provider is willing to be charged for each impression, click, or other action. For example, a CPM campaign is associated with a bid of five cents for an impression, a CPC campaign is associated with a bid of five dollars for a click, and a CPA campaign is associated with a bid of five hundred dollars for a conversion (e.g., a purchase of a product or service).

Content Item Selection Events

As mentioned previously, a content item selection event is when multiple content items are considered and a subset selected for presentation on a computing device in response to a request. Thus, each content request that content delivery exchange 120 receives triggers a content item selection event.

Specifically, in response to receiving a content request, content delivery exchange 120 analyzes multiple content delivery campaigns to determine whether attributes associated with the content request (e.g., attributes of a user that initiated the content request, attributes of a computing device operated by the user, current date/time) satisfy targeting criteria associated with each of the analyzed content delivery campaigns. If so, the content delivery campaign is considered a candidate content delivery campaign. One or more filtering criteria may be applied to a set of candidate content delivery campaigns to reduce the total number of candidates.

A final set of candidate content delivery campaigns is ranked based on one or more criteria, such as predicted click-through rate (which may be relevant only for CPC campaigns), effective cost per impression (which may be relevant to CPC, CPM, and CPA campaigns), and/or bid price. Each content delivery campaign may be associated with a bid price that represents how much the corresponding content provider is willing to pay (e.g., content delivery exchange 120) for having a content item of the campaign presented to an end-user or selected by an end-user. Different content delivery campaigns may have different bid prices. Generally, content delivery campaigns associated with relatively higher bid prices will be selected for displaying their respective content items relative to content items of content delivery campaigns associated with relatively lower bid prices. Other factors may limit the effect of bid prices, such as objective measures of quality of the content items (e.g., actual click-through rate (CTR) and/or predicted CTR of each content item), budget pacing (which controls how fast a campaign's budget is used and, thus, may limit a content item from being displayed at certain times), frequency capping (which limits how often a content item is presented to the same person), and a domain of a URL that a content item might include.

An example of a content item selection event is an advertisement auction, or simply an "ad auction."

In one embodiment, content delivery exchange 120 conducts one or more content item selection events. Thus, content delivery exchange 120 has access to all data associated with making a decision of which content item(s) to select, including bid price of each campaign in the final set of content delivery campaigns, an identity of an end-user to which the selected content item(s) will be presented, an indication of whether a content item from each campaign was presented to the end-user, a predicted CTR of each campaign, a CPC or CPM of each campaign.

In another embodiment, an exchange that is owned and operated by an entity that is different than the entity that owns and operates content delivery exchange 120 conducts one or more content item selection events. In this latter embodiment, content delivery exchange 120 sends one or more content items to the other exchange, which selects one or more content items from among multiple content items that the other exchange receives from multiple sources. In this embodiment, content delivery exchange 120 does not know (a) which content item was selected if the selected content item was from a different source than content delivery exchange 120 or (b) the bid prices of each content item that was part of the content item selection event. Thus, the other exchange may provide, to content delivery exchange 120 (or to a performance simulator described in more detail herein), information regarding one or more bid prices and, optionally, other information associated with the content item(s) that was/were selected during a content item selection event, information such as the minimum winning bid or the highest bid of the content item that was not selected during the content item selection event.

Tracking User Interaction

Content delivery exchange 120 tracks one or more types of user interactions across client devices 142-146 (and other client devices not depicted). For example, content delivery exchange 120 determines whether a content item that content delivery exchange 120 delivers is presented at (e.g., displayed by or played back at) a client device. Such a "user interaction" is referred to as an "impression." As another example, content delivery exchange 120 determines whether a content item that exchange 120 delivers is selected by a user of a client device. Such a "user interaction" is referred to as a "click." Content delivery exchange 120 stores such data as user interaction data, such as an impression data set and/or a click data set.

For example, content delivery exchange 120 receives impression data items, each of which is associated with a different instance of an impression and a particular content delivery campaign. An impression data item may indicate a particular content delivery campaign, a specific content item, a date of the impression, a time of the impression, a particular publisher or source (e.g., onsite v. offsite), a particular client device that displayed the specific content item, and/or a user identifier of a user that operates the particular client device. Thus, if content delivery exchange 120 manages multiple content delivery campaigns, then different impression data items may be associated with different content delivery campaigns. One or more of these individual data items may be encrypted to protect privacy of the end-user.

Similarly, a click data item may indicate a particular content delivery campaign, a specific content item, a date of the user selection, a time of the user selection, a particular publisher or source (e.g., onsite v. offsite), a particular client device that displayed the specific content item, and/or a user identifier of a user that operates the particular client device.

Process Overview

Figure 2:
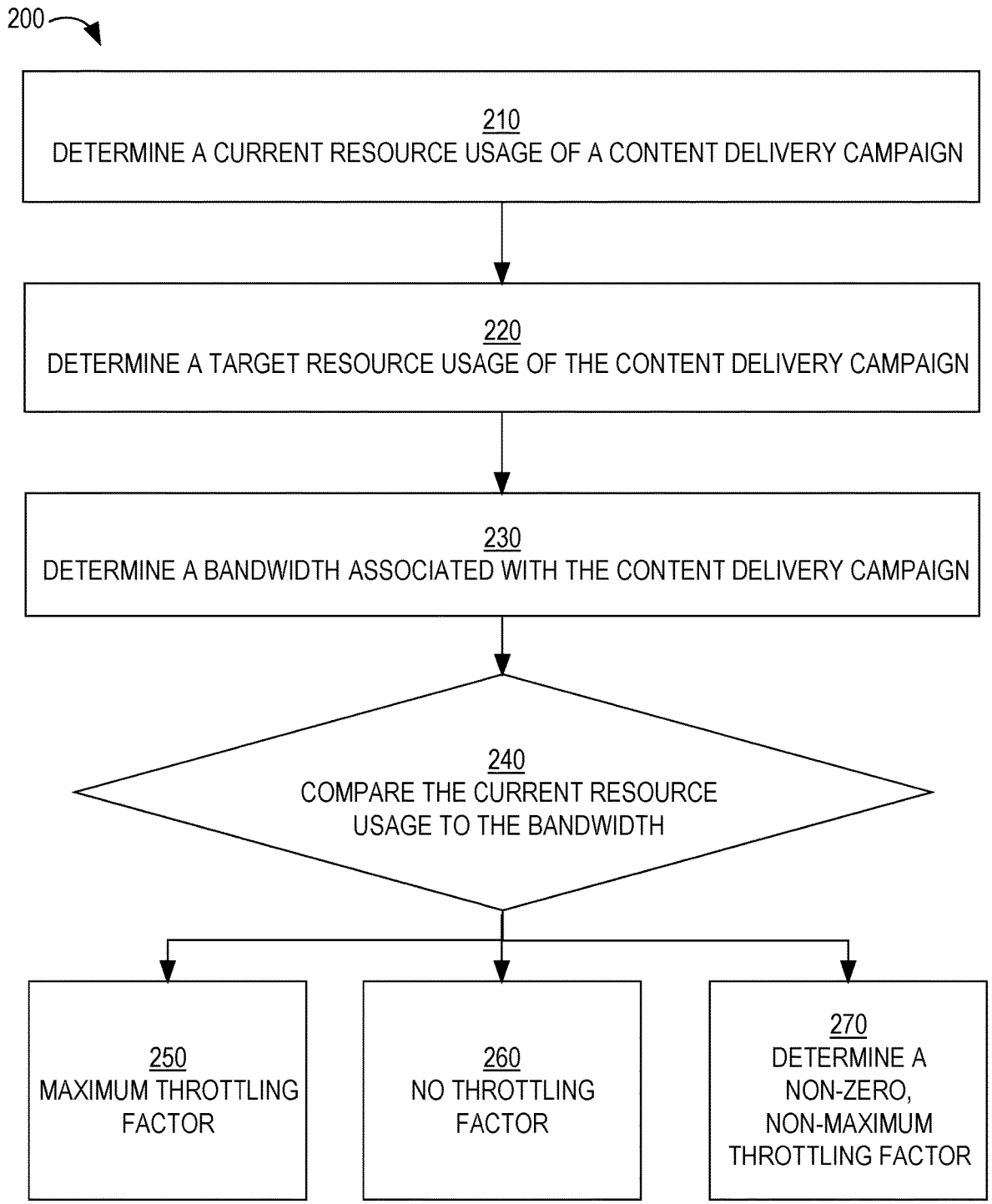
FIG. 2 is a flow diagram that depicts a process for controlling resource usage associated with a particular content delivery campaign, in an embodiment.

FIG. 2 is a flow diagram that depicts a process 200 for controlling the resource usage associated with a particular content delivery campaign, in an embodiment. Process 200 may be implemented by content delivery exchange 120. Process 200 may be performed in response to a content request that initiates a content item selection event. For example, process 200 may be performed for multiple content delivery campaigns that are candidates for a single content item selection event. Alternatively, process 200 may be performed offline; that is, not in response to a content request but in anticipation of a content request. For example, process 200 may occur every ten minutes for a set of (e.g., all active) content delivery campaigns.

At block 210, a current resource usage of a content delivery campaign is determined. "Resource usage" may refer to a number of impressions that have occurred, a number of clicks that have occurred, a number of another type of action that has occurred, or an amount of money that a content provider must compensate content delivery exchange 120 for delivering content items associated with one or more content delivery campaigns initiated by the content provider. For example, 10% of a daily budget associated with a content delivery campaign has been used up until a time when block 210 is performed.

Current resource usage is usage of a resource for a particular period of time ending at the present time. Current resource usage may be an estimate based on current statistics (e.g., based on user interaction data items, such as impression data items or click data items) or may reflect only the user interaction data items and, as a result, may be old or stale, i.e., reflecting a period of time that excludes a most recent period of time, such as the most recent two minutes, due to the speed (or lack thereof) in which user interaction data items are collected and processed by content delivery exchange 120. However, the staleness (or most recent period of time) may be small enough that the actual resource usage (reflected in the current state of the user interaction data) is sufficient for pacing purposes.

In an embodiment, multiple content delivery campaigns share a single budget. Therefore, block 210 may involve determining a current resource usage of a set of campaigns, even though process 200 might be performed for a content item selection event that involves only one content delivery campaign in the set.

Block 210 may involve determining how many clicks have occurred (if the content delivery campaign is a CPC campaign) during a period of time, how many impressions have occurred (if the content delivery campaign is a CPM campaign) during the period of time, or how many of a particular type of action has occurred during that period of time. Additionally, block 210 may involve determining what the minimum winning bid was for each content item selection event in which the impression/click/action occurred, since different content item selection events may be associated with different minimum winning bids. The higher the minimum winning bids, the higher the current resource usage (all else being equal). Conversely, the lower the minimum winning bids, the lower the current resource usage.

At block 220, a target resource usage of the content delivery campaign is determined. The target resource usage reflects an amount of resource that is planned to be used by a particular point in time, such as a particular time within a usage cycle (e.g., a day) or within the life of the content delivery campaign. Typically, as the time within a usage cycle passes or the "life" of the content delivery campaign passes, the target resource usage increases. The target resource usage of a content delivery campaign may be represented by a straight line (i.e., with a constant slope) on a graph where the x-axis is time. Alternatively, the target resource usage may be represented by a line with varying slope. For example, the slope may decrease over one time period in a usage cycle and may increase over another time period in the usage cycle.

Thus, at time 1, the target resource usage of a content delivery campaign is A and at time 2 (which is later than time 1), the target resource usage of the content delivery campaign may be B, which is greater than A.

Further, if the life of a content delivery campaign is divided into multiple time periods (e.g., different days), where each time period is associated with a fresh/zero/reset current resource usage, different time periods may be associated with different target resource usage lines. For example, target resource usage on day 1 may be uniform (i.e., a straight line) and target resource usage on day 2 may start out relatively low and then increase dramatically at the end of the day. As another example, the target resource usage on a weekend day may be different than the target resource usage on a weekday.

Target resource usage for a content delivery campaign may be based on past performance (i.e., actual resource usage) of the content delivery campaign, past performance of other content delivery campaigns from the same content provider, and/or past performance of similar content delivery campaigns (e.g., that target a similar audience or that pertain to a certain type of industry, product, or service). Thus, different content delivery campaigns may be associated with different target resource usages.

At block 230, a bandwidth around the target resource usage is determined. The bandwidth is a distance between an upper bound (which is greater than the target resource usage) and a lower bound (which is lesser than the target resource usage). The greater the bandwidth, the greater the current resource usage can fluctuate.

At block 240, the current resource usage is compared to the bandwidth. The result of block 240 is one of three options, each of which corresponds to one of blocks 250-270.

If the current resource usage is greater than the upper bound, then process 200 proceeds to block 250.

At block 250, the content delivery campaign is prevented from participating in one or more content item selection events (including the content item selection event that, in an embodiment, is triggered process 200), even if the targeting criteria of the content delivery campaign perfectly matches targeting data associated with a content request that content delivery exchange 120 receives and even if a bid and/or predicted click-through rate (pCTR) associated with the content delivery campaign is/are higher than any other the bid/pCTR of every other candidate content delivery campaign. Block 250 may be considered as establishing a maximum throttling factor (e.g., 1), which indicates that the content delivery campaign should not participate in any content item selection event until (at a later time) the current resource usage becomes closer than the target resource usage (determined at that later time).

If the current resource usage is less than the lower bound, then process 200 proceeds to block 260.

At block 260, the content delivery campaign is allowed to participate in one or more content item selection events (including the content item selection event that, in an embodiment, is triggered process 200). In block 260, there is no throttling factor, which indicates that it is desired that the content delivery campaign participate in as many content item selection events as possible, at least because the current resource usage is below the target resource usage by a particular amount.

If the current resource usage is between the upper bound and the lower bound, then process 200 proceeds to block 270.

At block 270, a throttling factor is determined that represents a likelihood that the content delivery campaign will participate in one or more content item selection events (including the content item selection event that, in an embodiment, is triggered process 200). The throttling factor is a non-zero, non-maximum throttling factor. The closer the current resource usage is to the upper bound of the bandwidth, the higher the throttling factor (i.e., the lower the likelihood of participating in a content item selection event). Conversely, the closer the current resource usage is to the lower bound of the bandwidth, the lower the throttling factor (i.e., the higher the likelihood of participating in a content item selection event).

Bandwidth

A bandwidth may be calculated in one of many ways. In an embodiment, a bandwidth is a constant width or difference throughout a usage cycle or throughout a life of content delivery campaign. For example, an upper bound may always be 10% greater than a target resource usage at any given time and a lower bound may always be 10% lower than the target resource usage at any given time. As another example, an upper bound may always be 12% greater than a target resource usage at any given time and a lower bound may always be 5% lower than the target resource usage at any given time.

In an alternative embodiment, a bandwidth varies with time. For example, at time 1, the bandwidth may be 10% around the target resource usage and, at time 2, the bandwidth may be 15% around the target resource usage.

In a related embodiment, different content delivery campaigns are associated with different bandwidths. For example, the greater the total budget or budget of a usage cycle, the greater the bandwidth.

A bandwidth that is too small will result in an unstable throttling parameter, while a bandwidth that is too large can lead to unnecessarily large tracking errors. In an embodiment, CPM campaigns are associated with bandwidths that are narrower or smaller than the bandwidths associated with CPC campaigns, which may only experience a few clicks per usage cycle (e.g., a single day).

In an embodiment, a bandwidth is based on a content delivery campaign's bid value. For example, the greater the bid value, the greater the bandwidth. As a specific example of a general rule, a bandwidth of a campaign may be three times the bid value of the campaign. A rationale for choosing a bandwidth is to keep the bandwidth as small as possible while maintaining a stable algorithm. In order to maintain a stable algorithm, a bandwidth should be as big as a resource usage event. For CPM campaigns, a resource usage event is an impression and the resource usage is roughly equivalent to the corresponding bid value. For CPC campaigns, a resource usage event is a click (or user selection) and (again) the resource usage is roughly equivalent to the corresponding bid value. (If content item selection events are considered second price auctions, then the resource usage for a single resource usage event is likely to be lower than the corresponding bid value.)

In a related embodiment, a bandwidth is calculated based on a campaign's bid and budget. The ratio between a bid and a budget corresponds to the amount a single impression or click will change the actual (current) resource usage. The following table illustrates some examples of a bandwidth as a function of the bid and budget:

| campaign | bid/budget | % daily budget spent by a single action | bandwidth |
| --- | --- | --- | --- |
| CPM: $.005 per bid. $100 budget | .00005 | .005% | .5% |
| CPC: $10 per bid. $100 budget | .1 | 10% | 10% |
| CPC: $20 per bid. $40 budget | .5 | 50% | 20% |
| CPC: $10 per bid. $1000 budget | .01 | 1% | 1% |

In an embodiment, a maximum bandwidth and/or a minimum bandwidth are established, even if the ratio of a bid/budget dictates a bandwidth that is greater than the maximum bandwidth or lesser than the minimum bandwidth. The first row in the above table shows that a minimum bandwidth (i.e., 0.5%) has been used instead of what the corresponding bid/budget ratio suggests (i.e., 0.005%).

Likewise, the second row in the above table shows that a maximum bandwidth (i.e., 20%) has been used instead of what the corresponding bid/budget ratio suggests (i.e., 50%).

The maximum bandwidth and/or the minimum bandwidth may be global, in that they are applicable to all (or most) content delivery campaigns, even campaigns established by different content providers. Alternatively, a maximum/minimum bandwidth may be established on a per-content provider basis or a per-campaign basis.

Offset

In an embodiment, an offset is defined that indicates where the bandwidth begins (or ends). For example, the offset dictates how much below the target resource usage the lower bound of a bandwidth is located or how much above the target resource usage the upper bound of the bandwidth is located. For example, a bandwidth may be 10% and an offset may be 7%, meaning that the lower bound is 7% below the target resource usage and the upper bound is 3% above the target resource usage.

In an embodiment, an offset varies over time. For example, the offset is greatest at the beginning of a usage cycle and approaches 0 or becomes 0 towards the end of the usage cycle. An offset at one point in a usage cycle may be such that the upper bound of a bandwidth is at or below a target resource usage. Such a scenario may be useful if it is desired that a content delivery campaign has a "slow start" and, as the usage cycle approaches the end, the offset decreases (if the offset defines the lower bound of the bandwidth), causing the content delivery campaign to have a "fast finish" (due to the upper bound curve increasing faster than the target resource usage curve) meaning the slope of a resulting current resource usage curve is more likely to increase such that the current resource usage curve approaches or surpasses the target resource usage curve.

Figure 3:
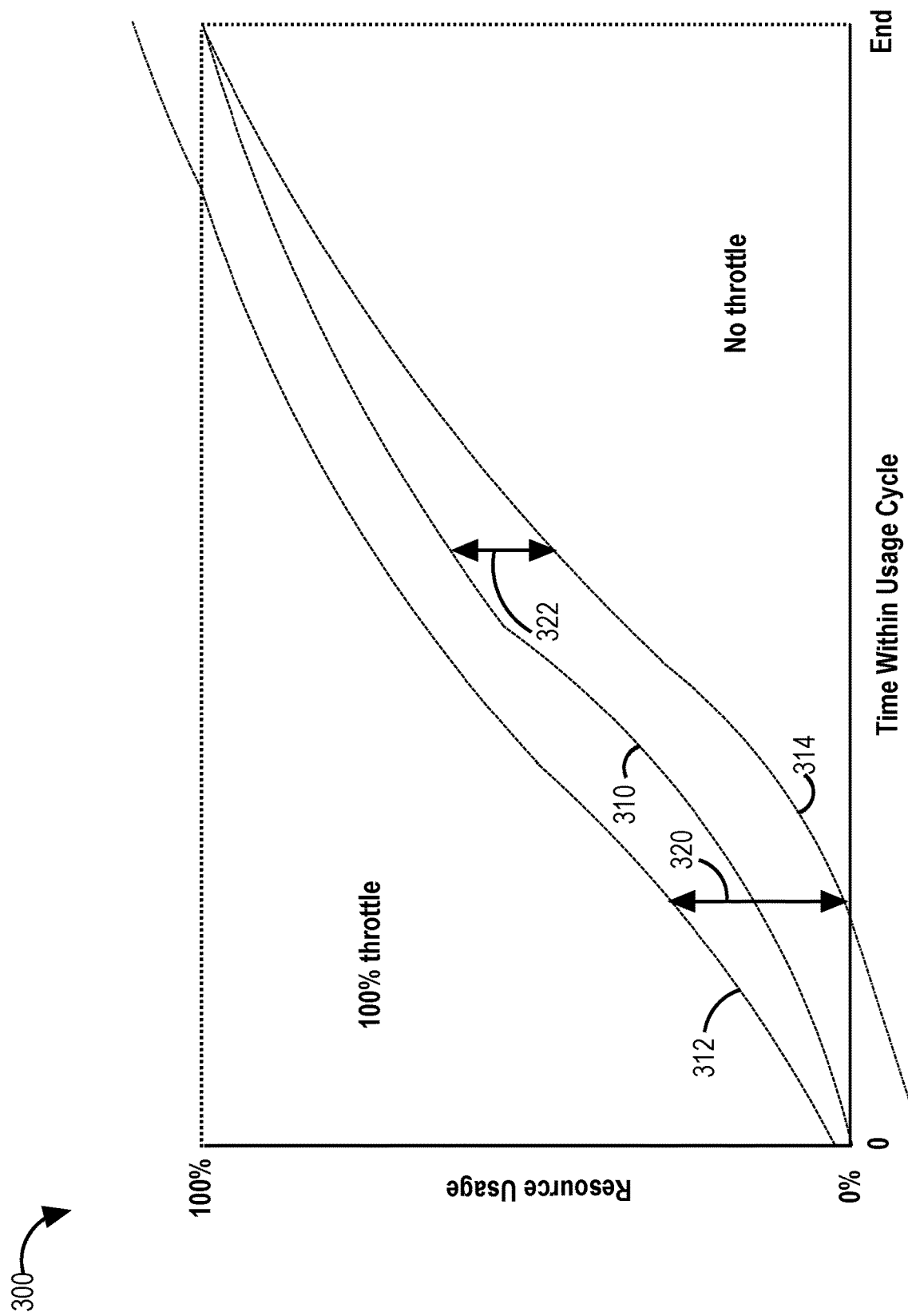
FIG. 3 is a chart that depicts a bandwidth and an offset relative to a target resource usage curve, in an embodiment.

FIG. 3 is a chart 300 that depicts a target resource usage curve 310, an upper bound curve 312, a lower bound curve 314, a bandwidth 320, and an offset 322, in an embodiment. The x-axis corresponds to time (ranging from time 0 to the end of a usage cycle) and the y-axis corresponds to resource usage (ranging from 0 resource usage to full or 100% resource usage). Bandwidth 320 is defined as the space between a point on upper bound curve 312 at time T and a point on lower bound curve 314 at time T. Offset 322 is defined as the space between a point on target resource usage curve 310 at time T and a point on lower bound curve 314 at time T. (In other implementations, offset 322 may be defined as the space between a point on target resource usage curve 310 at time T and a point on upper bound curve 312 at time T.

As indicated in the example of chart 300, the bandwidth and the offset change over time. Also, chart 300 indicates that if current resource usage at a particular time is above upper bound curve 312, then the throttling factor is to be 100%, indicating that the corresponding content delivery campaign will not participate in one or more content item selection events. Conversely, if current resource usage at a particular time is below lower bound curve 314, then the throttling factor is to be 0%, indicating that the corresponding content delivery campaign will not be prevented from participating in one or more content item selection events based on the throttling factor.

Chart 300 also indicates that, based on the portion of upper bound curve 312 that extends beyond 100% resource usage, greater than 100% resource usage is acceptable. Also, the portion of lower bound curve 314 that extends below 0% resource usage indicates that there will be some throttling initially, forcing the content delivery campaign to have a "slow start."

Different content delivery campaigns may have different offsets. The different offsets may be based on the type of charging model (e.g., CPM v. CPC) of the content delivery campaign. For example, CPM campaigns may generally have lower offsets than CPC campaigns at the beginning of a usage cycle, but may generally have higher offsets than CPC campaigns at the end of the usage cycle. As another example, CPC campaigns may generally have stable (e.g., unchanging) offsets (e.g., 5% below the target resource usage curve) while CPM campaigns may generally have varying offsets (e.g., 10% below the target resource usage at the beginning of a usage cycle and 0% below the target resource usage at the end of the usage cycle).

In an embodiment, an offset for a single content delivery campaign may vary across usage cycles. For example, on the beginning of usage cycle 1 (e.g., day 1), the offset begins at 10% below the target resource usage and on the beginning of usage cycle 2 (e.g., day 2), the offset begins at 5% below the target resource usage.

In an embodiment where no offset is established for a content delivery campaign, the target resource usage curve represents the center of the bandwidth. Thus, if the bandwidth is known, then the upper and lower bounds of the bandwidth can be easily determined/calculated.

Interpolation

As described previously, if a current resource usage is at or above the upper bound of a bandwidth, then a throttling factor is set to be a maximum value (e.g., 1.0), indicating that the corresponding content delivery campaign will not participate in a content item selection event. If the current resource usage is at or below the lower bound of the bandwidth, then the throttling factor is set to be a minimum value (e.g., 0), indicating that the corresponding content delivery campaign will not be prevented from participating in a content item selection event, at least based on the throttling factor. (Other factors may keep the content delivery campaign from participating in a content item selection event, such as a bid price and/or a predicted click-through rate, which may be lower relative to other content delivery campaigns.)

If it is determined that the current resource usage is within the bandwidth of a target resource usage at a particular time, then the throttling factor is set to be a value between the maximum value and the minimum value. The throttling factor may be determined using interpolation, such as linear interpolation.

For example, the upper and lower bounds of a bandwidth at time T are determined. A first difference between the current resource usage at time T ($C_T$) and the lower abound ($LB_T$) is determined (e.g., $C_T-LB_T$). Also, a second difference between the upper bound ($UB_T$) at time T and $LB_T$ is determined (e.g., $UB_T-LB_T$). A ratio between the first difference and the second difference is calculated (e.g., $(C_T-LB_T)/(UB_T-LB_T)$) and can be used as the throttling factor.

For example, if the bandwidth defines a range of values and current resource usage is exactly in the middle of the range (i.e., between the upper bound and the lower bound of the bandwidth, then the throttling factor is 50% of the maximum throttling value (e.g., 0.5). If the current resource usage is ¼ of the way from the minimum value in the range of values, then the throttling factor is 25% of the maximum throttling value (e.g., 0.25). If the current resource usage is 1/20 of the way from the minimum value in the range of values, then the throttling factor is 5% of the maximum throttling value (e.g., 0.05).

Figure 4:
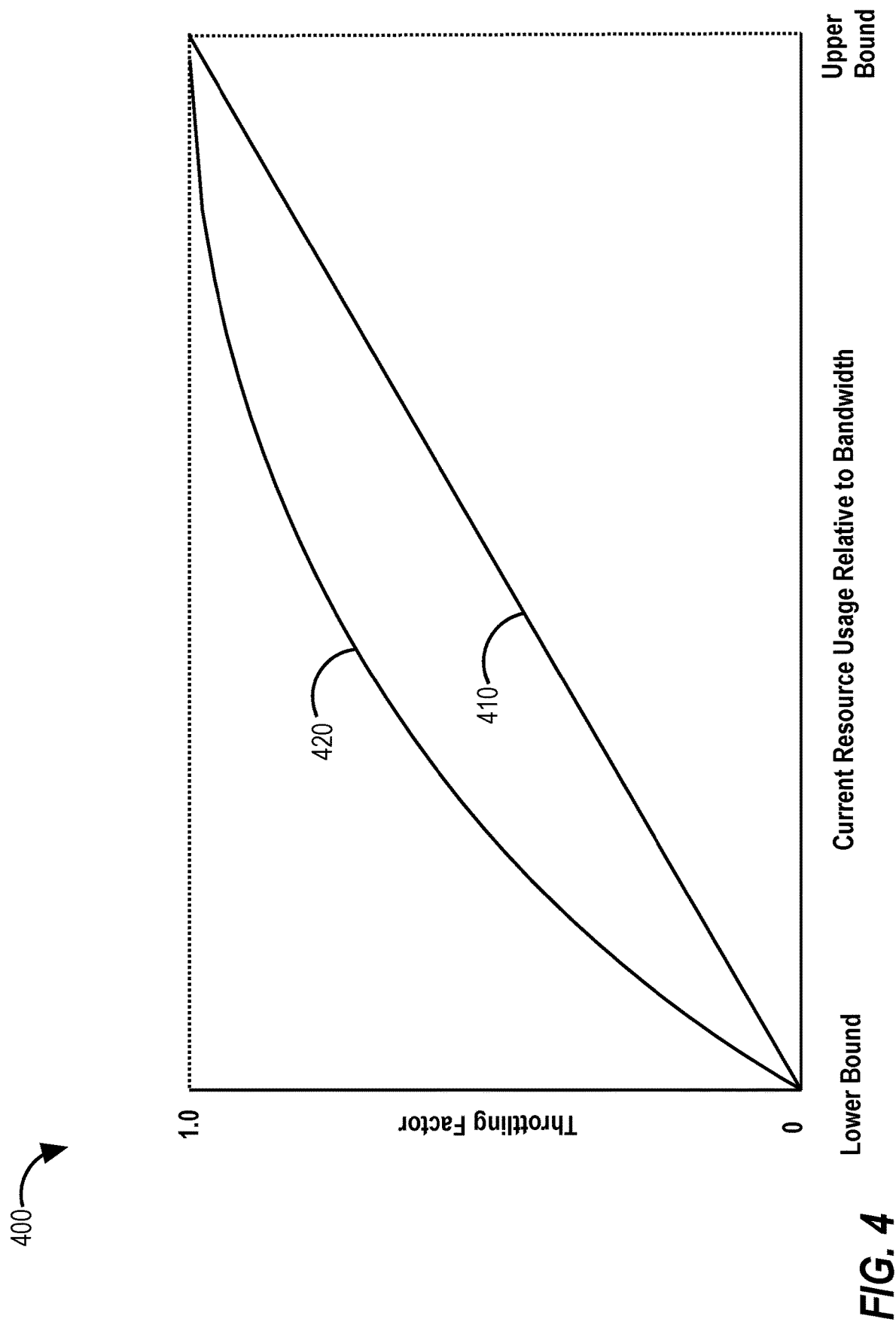
FIG. 4 is a chart that depicts linear and non-linear interpolation for determining a throttling factor, in an embodiment.

FIG. 4 is a chart 400 that depicts a linear interpolation for determining a throttling factor, in an embodiment. (The information in chart 400 may be implemented in a mapping or a two-column table.) The x-axis of chart 400 corresponds to a current resource usage relative to a bandwidth. The left side (or 0 value) of the x-axis represents the lower bound of an associated bandwidth. The right side of the x-axis represents the upper bound of the associated bandwidth. The y-axis of chart 400 corresponds a throttling factor and ranges from 0 (or no) throttling to maximum throttling. Line 410 illustrates linear interpolation where, given an increase in current resource usage, there is an equal corresponding increase in throttling factor.

In a related embodiment, non-linear interpolation is used to determine a throttling factor. Chart 400 includes curve 420 that illustrates an example of non-linear interpolation where, given an increase in current resource usage near the lower bound of a bandwidth, there is a greater corresponding increase in throttling factor. In other words, the slope of curve 420 is greater than the slope of line 410 (which has a constant slope) near the lower bound of the bandwidth. But, in this example, given an increase in current resource usage near the upper bound of the bandwidth, there is a lesser corresponding increase in throttling factor. If a curve like curve 420 is followed in determining a throttling factor, then that may indicate a desire to err on the side of greater throttling.

Bid Adjustment

In an embodiment, a bid value is adjusted based on a difference between a current resource usage and a target resource usage. For example, if the current resource usage is greater than the target resource usage, then the bid value decreases. Conversely, if the current resource usage is less than the target resource usage, then the bid value increases. Unlike throttling which affects the probability of participating in a content item selection event, bid adjustment affects the probability of winning a content item selection event.

In an embodiment, a bid value may only increase and/or decrease based on current policy, which may be a policy established by content delivery exchange 120 or by content providers. Thus, different content delivery campaigns may be associated with different policies. For example, one content delivery campaign may not allow a bid to increase while another content delivery campaign may not allow a bid to change at all.

In a related embodiment, if bid adjustment is allowed for a content delivery campaign, then the bid is adjusted before a throttling factor is applied. For example, if a current resource usage of a content delivery campaign is greater than a target resource usage of the content delivery campaign, then a bid value of the content delivery campaign is decreased. In subsequent content item selection events, a throttling factor is calculated and applied to determine whether the content delivery campaign will participate in those content item selection events.

Bid adjustment may occur until the bid value reaches a pre-defined maximum bid or minimum bid. For example, a content delivery campaign begins with a bid value of $3 and is associated with a maximum bid of $5 and a minimum bid of $2. The greater the current resource usage is relative to the target resource usage, the lower the bid until it reaches the minimum bid. Conversely, the lower the current resource usage is relative to the target resource usage, the higher the bid until it reaches the maximum bid. Alternatively, bid adjustment is applied until the current resource usage is outside of a bandwidth, which may be the same or different than the bandwidth described herein. For example, one relatively narrow bandwidth (e.g., +/−5%) is used for bid adjustment and another relatively wider bandwidth (e.g., +/−15%) is used for probabilistic throttling.

In a related embodiment, bid adjustment is the sole mechanism for controlling/pacing resource usage. In other words, in this embodiment, a probability throttling factor is not calculated and used to determine whether the corresponding content delivery campaign will participate in a current (and/or future) content item selection event.

In an embodiment, an amount to adjust a bid is determined based on a history of content item selection events and the winning bid values (or minimum winning bid values). A minimum winning bid is a bid value, in a content item selection event, that is the highest of all bids that were not selected (i.e., for presenting the corresponding content items). The history may be reflected as a percentage of previous content item selection events in which a content delivery campaign (or an associated content item) was selected given a specific bid value (e.g., $3.15) or a range of bid values (e.g., $3.00-$3.25). For example, a bid value of $2.60 would have won 35% of a set of content item selection events, whereas a bid value of $3.50 would have won 65% of the set of content item selection events (including the 35% that would have been won based on $2.60). Generally, the higher the bid, the more likely the bid will win (or be one of the winners of) a content item selection event. Conversely, the lower the bid, the less likely the bid will win (or be selected as a result of) a content item selection event.

In an embodiment, different content delivery campaigns are associated with different bid distribution-win probabilities. Thus, the history of content item selection events may be limited to content item selection events in which the corresponding content delivery campaign participated. If there is little to no history (e.g., because the content delivery campaign is new), then content item selection events of similar campaigns (e.g., in terms of the target audience, the targeting criteria, a target industry, a language, and/or a geography) may be analyzed to determine a distribution of bid values and their respective probabilities.

Offsite Vs. Onsite

In an embodiment, where a content item selection event is conducted has an impact on how resource usage is controlled. Content delivery exchange 120 (considered "onsite") may conduct one set of content item selection events and a third-party exchange (considered "offsite") may conduct another set of content item selection events (to which content delivery exchange 120 may bid on behalf of one or more content providers). Some content delivery campaigns may participate in both sets of content item selection events.

As an example of a difference in controlling resource usage, if a content item selection event occurs onsite, then a bandwidth may have an average width (if the bandwidth varies at all) of 20% while if a content item selection event occurs offsite, then the bandwidth may have an average width of 10%, indicating that there may be more volatility in resource usage events that occur offsite, such as impression events and click events. Events that occur offsite may take longer to detect since one or more third parties are relied on to report such events. In contrast, onsite events may be detected in near real-time.

As another example, the bandwidth associated with a content delivery campaign is the same regardless of whether a content item selection event occurs onsite or offsite. However, the offset may be different. For example, for onsite content item selection events, the offset is 5% below the target resource usage at time T. For offsite content item selection events, the offset is 10% below the target resource usage at time T.

In an embodiment, different third-party exchanges are associated with different bandwidths, different offsets, and or different interpolations. The size of such bandwidths and offsets and shape of such interpolations may be based on how quickly usage events are reported to content delivery exchange 120. For example, relatively faster reporting third-party exchanges may be associated with generally smaller (or narrower) bandwidths and offsets and flatter interpolations (i.e., whose slope is constant or near constant) than relatively slower reporting third-party exchanges.

Benefits

Embodiments provide one or more of the following benefits over current approaches for controlling resource consumption in a computing environment. One benefit is that calculating a throttling factor based on a current resource usage, a target resource usage, and a bandwidth is a stateless operation. In another approach, if a current resource usage is determined to be greater than a target resource usage, then a previous throttling factor (PTF) that was calculated previously for the content delivery campaign is increased (e.g., PTF*1.1); else, the PTF for the content delivery campaign is decreased (e.g., PTF*0.9).

Because embodiments involve a stateless operation, a slow start is not required. A "slow start" (which may be implemented in a stateful implementation) is the idea that at the beginning of the day, all content delivery campaigns reset their throttle rate to a large value (like 90%) for 10 minutes and then is allowed to change. This is only really necessary in a stateful implementation because an initial state must be set. With a proportional (stateless) approach, a throttling factor can be computed using a formula described herein. In other words, the proportional approach does not require any special initialization.

Another benefit of embodiments herein is that the throttling factor immediately adjusts instead of slowing changing the throttling factor by a fixed amount (e.g., 10%) each iteration, as in the other approach.

Another benefit of embodiments herein is that the throttling factor is relatively stable and does not suffer from large swings in value as in the other approach.

Another benefit of embodiments herein is that the throttling factor is more consistent across multiple computing nodes, each of which might take part in conducting content item selection events and, thus, need to calculate a throttling factor. Because the other approach is stateful, when one computing node updates a throttling factor for a content delivery campaign, other computing nodes need to quickly be notified of the change so that any future changes are applied to the newly updated throttling factor. Due to latency between computing nodes, the other approach may suffer from inconsistent throttling factors.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
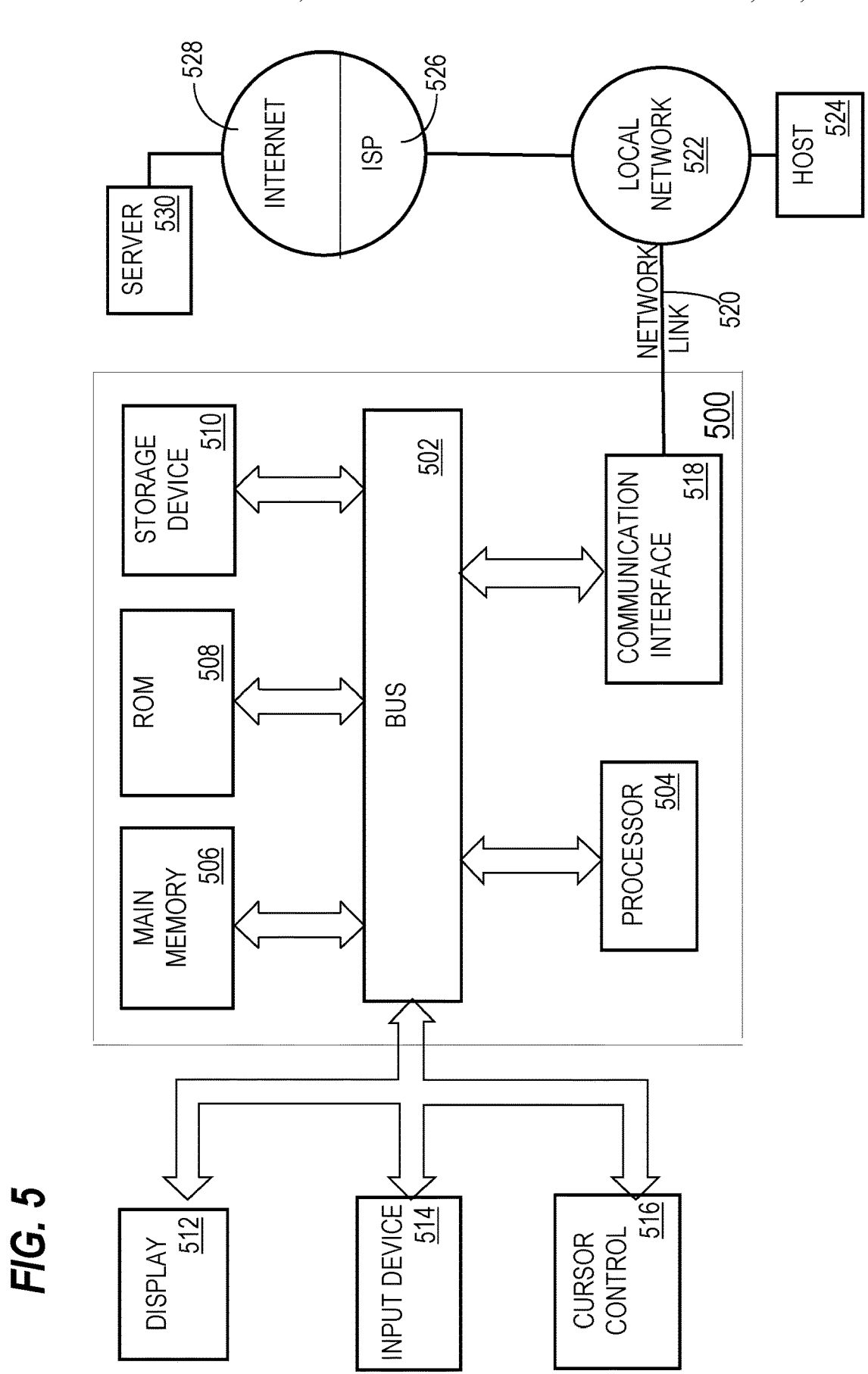
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more storage media storing instructions for generating throttling factors using a stateless operation, wherein the instructions, when executed by one or more processors, cause:

receiving, over a computer network, from a client device, at a content delivery system, a request for one or more content items;

in response to receiving the request, the content delivery system:

identifying a plurality of content delivery campaigns that includes a content delivery campaign;

determining, for the content delivery campaign, a first target resource usage for a particular point in time;

determining, for the content delivery campaign, a first current resource usage for the particular point in time;

determining a first bandwidth associated with the first target resource usage at the particular point in time, wherein the first bandwidth is, at the particular point in time, a first range of resource usage values that includes the first target resource usage;

based on a first difference between the first current resource usage and one or more boundaries of the first bandwidth and not based on a previous throttling factor that was previously calculated for the content delivery campaign, calculating a throttling factor;

based on the throttling factor, determining a probability of the content delivery campaign participating in a first content item selection event;

receiving, from a second client device, at the content delivery system, a second request for one or more content items;

in response to receiving the second request, the content delivery system:

identifying a second plurality of content delivery campaigns that includes the content delivery campaign;

determining, for the content delivery campaign, a second target resource usage for a second point in time that is after the particular point in time;

determining, for the content delivery campaign, a second current resource usage for the second point in time;

determining a second bandwidth associated with the second target resource usage at the second point in time, wherein the second bandwidth is, at the second point in time, a second range of resource usage values that includes the second target resource usage;

based on the second current resource usage being greater than the second range of resource usage values of the second bandwidth and not based on the throttling factor that was previously calculated for the content delivery campaign, determining that the content delivery campaign is not to participate in a second content item selection event.

2. The one or more storage media of claim 1, wherein the instructions, when executed by the one or more processors, further cause:

prior to calculating the throttling factor, calculating the first bandwidth based on a bid value of the content delivery campaign.

3. The one or more storage media of claim 2, wherein calculating the first bandwidth comprises calculating the first bandwidth also based on a budget of the content delivery campaign.

4. The one or more storage media of claim 1, wherein the instructions, when executed by the one or more processors, further cause:

determining a current time within a usage cycle;

wherein calculating the throttling factor is also based on the current time within the usage cycle.

5. The one or more storage media of claim 1, wherein the instructions, when executed by the one or more processors, further cause:

determining, for the content delivery campaign, a third target resource usage for a third point in time that is later than the particular point in time;

determining, for the content delivery campaign, a third current resource usage for the third point in time;

determining a third bandwidth associated with the third target resource usage;

based on the third current resource usage being lower than both boundaries of the third bandwidth, determining to not throttle the content delivery campaign from participating in a third content item selection event.

6. The one or more storage media of claim 1, wherein the the first range of values of the first bandwidth is greater than the second range of values of the second bandwidth.

7. The one or more storage media of claim 1, wherein the instructions, when executed by the one or more processors, further cause:

determining an offset associated with the first target resource usage at the particular point in time;

wherein the offset indicates at least one of the one or more boundaries of the first bandwidth;

wherein calculating the throttling factor comprises calculating the throttling factor based on the offset.

8. The one or more storage media of claim 7, wherein the offset is a first offset, wherein the instructions, when executed by the one or more processors, further cause:

determining, for the content delivery campaign, a third target resource usage for a third point in time that is later than the particular point in time;

determining, for the content delivery campaign, a third current resource usage for the third point in time;

determining a third bandwidth associated with the third target resource usage;

determining a second offset associated with the third target resource usage;

wherein the second offset is different than the first offset;

wherein the second offset indicates at least one of the one or more boundaries of the third bandwidth;

based on a difference between the third current resource usage and one or more boundaries of the third bandwidth, calculating a second throttling factor;

based on the second throttling factor, determining a second probability of the content delivery campaign participating in a third content item selection event.

9. The one or more storage media of claim 1, wherein the instructions, when executed by the one or more processors, further cause:

if it is determined that the first current resource usage is greater than an upper boundary of the first bandwidth, then the throttling factor is set to a maximum throttling value;

if it is determined that the first current resource usage is less than a lower boundary of the first bandwidth, then the throttling factor is set to a minimum throttling value; and if it is determined that the first current resource usage is (1) less than the upper boundary of the first bandwidth and (2) greater than the lower boundary of the first bandwidth, then the throttling factor is set to a throttling value that is between the maximum throttling value and the minimum throttling value.

10. The one or more storage media of claim 1, wherein the instructions, when executed by the one or more processors, further cause:

determining whether the first current resource usage is within the boundaries of the first bandwidth;

in response to determining that the first current resource usage is within the boundaries of the first bandwidth, determining a ratio of (1) the first difference between the first current resource usage and one or more boundaries of the first bandwidth and (2) a difference between two boundaries of the first bandwidth;

wherein calculating the throttling factor comprises calculating the throttling factor based on the ratio.

11. The one or more storage media of claim 1, wherein the first content item selection event is conducted onsite, wherein the instructions, when executed by the one or more processors, further cause:

determining, for the content delivery campaign, a third target resource usage for a third point in time;

determining, for the content delivery campaign, a third current resource usage for the third point in time;

determining a third bandwidth associated with the third target resource usage at the third point in time;

based on a second difference between the third current resource usage and one or more boundaries of the third bandwidth, calculating a second throttling factor;

based on the second throttling factor, determining a second probability of the content delivery campaign participating in a third content item selection event that is different than the first and second content item selection events and that is conducted offsite;

wherein a size of the first bandwidth is based on the first content item selection event being conducted onsite;

wherein a size of the second bandwidth is based on the second content item selection event being conducted offsite.

12. The one or more storage media of claim 1, wherein the first content item selection event is different than a prior content item selection event that was conducted prior to calculating the throttling factor, wherein the instructions, when executed by the one or more processors, further cause:

for the prior content item selection event, adjusting a bid value associated with the content delivery campaign to generate an adjusted bid value;

conducting the prior content item selection event based on the adjusted bid value.

13. The one or more storage media of claim 12, wherein calculating the throttling factor is performed in response to determining that the adjusted bid value is greater than a particular threshold or would be greater than the particular threshold if adjusted again.

14. A method for generating throttling factors using a stateless operation, the method comprising:

receiving, over a computer network, from a client device, at a content delivery system, a request for one or more content items;

in response to receiving the request, the content delivery system:

identifying a plurality of content delivery campaigns that includes a content delivery campaign;

determining, for the content delivery campaign, a first target resource usage for a particular point in time;

determining, for the content delivery campaign, a first current resource usage for the particular point in time;

determining a first bandwidth associated with the first target resource usage at the particular point in time, wherein the first bandwidth is, at the particular point in time, a first range of resource usage values that includes the first target resource usage;

based on a first difference between the first current resource usage and one or more boundaries of the first bandwidth and not based on a previous throttling factor that was previously calculated for the content delivery campaign, calculating a throttling factor;

based on the throttling factor, determining a probability of the content delivery campaign participating in a first content item selection event;

receiving, from a second client device, at the content delivery system, a second request for one or more content items;

in response to receiving the second request, the content delivery system:

identifying a second plurality of content delivery campaigns that includes the content delivery campaign;

determining, for the content delivery campaign, a second target resource usage for a second point in time that is after the particular point in time;

determining, for the content delivery campaign, a second current resource usage for the second point in time;

determining a second bandwidth associated with the second target resource usage at the second point in time, wherein the second bandwidth is, at the second point in time, a second range of resource usage values that includes the second target resource usage;

based on the second current resource usage being greater than the second range of resource usage values of the second bandwidth and not based on the throttling factor that was previously calculated for the content delivery campaign, determining that the content delivery campaign is not to participate in a second content item selection event;

wherein the method is performed by one or more computing devices.

15. The method of claim 14, further comprising:
determining a current time within a usage cycle;
wherein calculating the throttling factor is also based on the current time within the usage cycle.

16. The method of claim 14, further comprising:
determining, for the content delivery campaign, a third target resource usage for a third point in time that is later than the particular point in time;
determining, for the content delivery campaign, a third current resource usage for the third point in time;
determining a third bandwidth associated with the third target resource usage;
based on the third current resource usage being lower than both boundaries of the third bandwidth,
determining to not throttle the content delivery campaign from participating in a third content item selection event.

17. The method of claim 14, further comprising:
determining an offset associated with the first target resource usage at the particular point in time;
wherein the offset indicates at least one of the one or more boundaries of the first bandwidth;
wherein calculating the throttling factor comprises calculating the throttling factor based on the offset.

18. The method of claim 14, further comprising:
determining whether the first current resource usage is within the boundaries of the first bandwidth;
in response to determining that the first current resource usage is within the boundaries of the first bandwidth, determining a ratio of (1) the first difference between the first current resource usage and one or more boundaries of the first bandwidth and (2) a difference between two boundaries of the first bandwidth;
wherein calculating the throttling factor comprises calculating the throttling factor based on the ratio.

19. The method of claim 14, wherein the first content item selection event is conducted onsite, the method further comprising:
determining, for the content delivery campaign, a third target resource usage for a third point in time;
determining, for the content delivery campaign, a third current resource usage for the third point in time;
determining a third bandwidth associated with the third target resource usage at the third point in time;
based on a second difference between the third current resource usage and one or more boundaries of the third bandwidth, calculating a second throttling factor;
based on the second throttling factor, determining a second probability of the content delivery campaign participating in a third content item selection event that is different than the first and second content item selection events and that is conducted offsite;
wherein a size of the first bandwidth is based on the first content item selection event being conducted onsite;
wherein a size of the second bandwidth is based on the second content item selection event being conducted offsite.

20. The method of claim 14, further comprising:
if it is determined that the first current resource usage is greater than an upper boundary of the first bandwidth, then the throttling factor is set to a maximum throttling value;
if it is determined that the first current resource usage is less than a lower boundary of the first bandwidth, then the throttling factor is set to a minimum throttling value; and
if it is determined that the current resource usage is (1) less than the upper boundary of the first bandwidth and (2) greater than the lower boundary of the first bandwidth, then the throttling factor is set to a throttling value that is between the maximum throttling value and the minimum throttling value.

* * * * *